Aug. 18, 1959  R. ZECHNALL ET AL  2,899,952
ELECTRICAL FUEL INJECTION CONTROL DEVICE
FOR INTERNAL-COMBUSTION ENGINES
Filed May 13, 1958
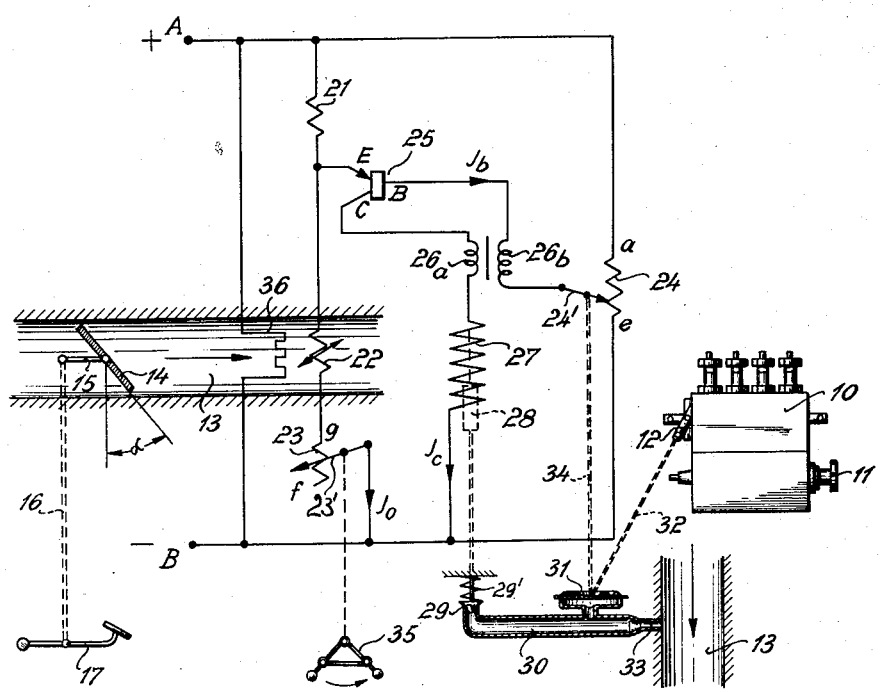
INVENTORS:
Richard Zechnall
Kurt Paule
by: Michael S. Striker
Attorney

United States Patent Office 2,899,952
Patented Aug. 18, 1959

2,899,952

ELECTRICAL FUEL INJECTION CONTROL DEVICE FOR INTERNAL-COMBUSTION ENGINES

Richard Zechnall, Stuttgart, and Kurt Paule, Stuttgart-Oberturkheim, Germany, assignors to Robert Bosch G.m.b.H., Stuttgart, Germany Application May 13, 1958, Serial No. 734,921

Claims priority, application Germany May 17, 1957

11 Claims. (Cl. 123—140)

The present invention refers to fuel injection arrangements for internal-combustion engines, and more particularly to an electrical fuel injection control device for internal-combustion engines operating on gasoline injection and external auto-ignition, the purpose of the control device being to adjust the amount of injected fuel per operational cycle in proportion to the amount of air drawn into the engine.

In internal-combustion engines it is known to use injection pumps the delivery of which is controlled by means of a vacuum-operated diaphragm device connected to the air suction pipe or intake manifold of the engine. This type of vacuum-operated speed control is usually mounted at a point of the suction pipe which lies in the direction of air flow beyond the tiltable butterfly valve which is used for arbitrarily controlling the rotary speed of the engine. Consequently, the vacuum to which the diaphragm device response depends mainly upon the position of the butterfly valve at a given moment and upon the rotary speed of the engine.

If, however, high fuel economy is desired then it is necessary to adjust the amount of fuel injected per cycle so as to correspond to the "real" amount of air drawn into the individual cylinders. The "real" amount of air, i.e. the amount of air which actually becomes effective in the combustion process, is not only determined by the position of the butterfly valve and by the rotational speed of the engine, but is affected also by the temperature of the drawn-in air and by the barometric pressure outside the engine. Moreover, still other factors influence the combustion process and particularly the formation of the fuel mixture, as for instance the temperature of the cooling water in the engine and the humidity content of the drawn-in air. These various factors cannot be simultaneously taken into account by a purely mechanical fuel injection control device, at least not in a satisfactory manner.

It has been proposed to replace mechanical fuel injection control devices by electrical control means capable of adjusting the amount of injected fuel in proportion to the amount of drawn-in air, such electrical control means comprising amplifier means including electron tubes or transistors.

It is, therefore, a main object of the invention to provide for a fuel injection control device which combines the features of certain vacuum-operated control devices with electrical control means in such a manner that the above-mentioned factors are taken into consideration by establishing a fixed relation between a vacuum set up in a vacuum chamber connected to the air intake, and the "real" amount of drawn-in air.

It is another object of the invention to provide for a device of the type set forth which is comparatively simple in its construction and reliable in operation.

With above objects in view, an electrical fuel injection control device for internal-combustion engines according to this invention mainly comprises an air supply duct for permitting air to be drawn into the engine; mechanical control means for controlling the amount of fuel injected into the engine; pressure-sensitive control means connected with the air duct and with the mechanical control means, and capable of actuating the latter depending upon the pressure existing in the air duct; and electrical control means operatively connected with the pressure-sensitive control means and with the air duct, and capable of modifying the action of the pressure-sensitive control means depending upon the velocity of the air stream in the air duct.

It should be noted that in those cases where mechanical injection pumps are used, the pressure-sensitive control means may be connected by mechanical control means to a control lever which adjusts the stroke of the piston in the fuel pump injecting the fuel. In those cases in which electromagnetically controlled injection valves are used, the duration of the open position thereof being determined by electrical impulses derived from a relaxation-oscillation generator operating with transistors, then the pressure-sensitive control means may be mechanically coupled with the control shaft of a variable resistor connected in parallel with a condenser, the discharge time constant of which determines the duration of the above-mentioned impulses. It has been found to be particularly advantageous to connect the pressure-sensitive control means mechanically with a variable resistor which as an auxiliary control means serves to actuate electromagnetically operated control members for modifying the action of the pressure-sensitive control means, particularly for modifying a vacuum existing in a vacuum chamber forming part of the pressure-sensitive control means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing which illustrates diagrammatically one embodiment of the invention including a circuit diagram of the electrical components thereof.

In this embodiment of the invention a fuel injection pump 10 is mounted on an internal-combustion engine (not shown) and is connected therewith for operation by a mechanical coupling 11. The amount of fuel injected by the pump 10 per operational cycle of the engine is adjustable by means of a control lever 12 tiltable between various positions.

The engine comprises an air duct 13 through which the air is drawn into the engine. For the sake of clarity of the illustration two portions of the air duct 13 are shown separately from each other in different parts of the drawing. A turnable butterfly valve 14 is mounted within the duct 13, the opening or position angle $\alpha$ is variable by the action of a lever 15 connected by mechanical transmission means 16 to the usual foot pedal 17.

In addition, the control device comprises electrical control means consisting mainly of a bridge circuit, one branch whereof is constituted by a fixed resistor 21, a heatable resistor 22 mounted within the duct 13, and a variable resistor 23, while the other branch of the bridge circuit is constituted by a potentiometer 24. The bridge circuit is connected to a source of direct current, not shown, but symbolized by the plus and minus symbols at the terminals A and B of the bridge circuit.

The control voltage appearing in the diagonal portion of the bridge, namely between the movable tapping contact 24' of the potentiometer 24 and the junction point between the fixed resistor 21 and the heatable resistor 22, is applied to the control circuit of a transistor 25 of the PNP-type the emitter electrode E of which is connected to the above-mentioned junction point and consequently both with the fixed resistor 21 and the heatable resistor 22. The base B of the transistor 25 is connected via the secondary winding 26b of a low frequency transformer with the tapping contact 24' of the potentiometer 24. The primary winding 26a of the transformer is connected in series between the collector electrode C of the transistor 25 and one end of a solenoid coil 27. The other end of this coil is connected with the minus pole of the above-mentioned source. The solenoid 27 operates a movable armature 28 which is mechanically connected with an ordinarily closed valve 29 having a valve spring 29' and mounted so as to close or open an outlet opening of a vacuum chamber 30.

The vacuum chamber 30 is connected by a narrow duct 33 with a portion of the air duct 13 of the engine. The vacuum chamber 30 is equipped with a diaphragm device 31 in such a manner that the diaphragm will be deformed in one way or the other depending upon the pressure or vacuum existing at any time within the chamber 30, said vacuum or pressure reflecting in turn the pressure conditions in the air duct 13. The diaphragm device 31 is mechanically and operatively connected by transmission means 32 with the above-mentioned control lever 12 of the injection pump 10. In addition, the device 31 is connected mechanically and operatively by transmission means 34 with the movable tapping contact 24' of the potentiometer 24.

In the air suction duct of the engine is also mounted a heating coil 36 preferably wound around the heatable resistor 22 in such a manner that the latter may be heated by the effect of an electric current passing through heating coil 36. The heatable resistor 22 has a negative characteristic so that its resistance is rapidly reduced to a low value when it is heated up to a high temperature by the heating coil 36. On the other hand, its resistance increases when the amount of air passing through the duct 13 increases due to increased velocity so that the temperature of the heatable resistor 22 decreases rapidly. It can be seen that the temperature of the heatable resistor 22 and therefore its resistance at all times is proportional to the amount of air drawn in per unit of time.

Since the amount of fuel injected per cycle is controlled by the position of the control lever 12, and since this lever is mechanically connected through the diaphragm device 31 with the tapping contact 24' of the potentiometer 24, the bridge circuit can be in balanced condition only when the amount of fuel injected is in the proper proportion with the drawn-in amount of air, provided, of course, that the starting positions of the involved control parts have been first of all adjusted accordingly. The diaphragm device 31 serves only the purpose of furnishing the mechanical power for moving the control lever 12 and the tapping contact 24'. In addition, the vacuum existing at any time in the vacuum chamber 30 must be in the proper proportion to the amount of drawn-in air, a condition which is met by this arrangement.

In practice, the above-described arrangement operates in the following manner in order to establish in the vacuum chamber 30 a vacuum which is in the proper relation to the amount of drawn-in air. May it be assumed that the amount and velocity of the air flowing through the duct 13 be very small and that the bridge circuit is so adjusted that the potential determined by the position of the contact 24' at e (as shown in the drawing) is practically equal to the voltage drop appearing across the fixed resistor 21 in view of the bridge current $J_o$ passing through the substantially heated heatable resistor 22 and through the variable resistor 23. The opening angle α of the butterfly valve 14 is assumed to be small. Consequently, although the amount of air drawn in is small, a high vacuum is set up in the vacuum chamber 30 via the connecting duct 33. Moreover, it may be assumed that in this case the rotary speed of the engine is so low that the speed-sensitive control means, e.g. a governor 35 coupled with the engine, and connected with the adjustable tapping contact 23' holds the latter in the neighborhood of the end f of the variable resistor 23.

For more clearly explaining the operation of the device, two typical operational conditions will be described below:

*1st condition.*—It is intended to move the butterfly valve 14 by stepping on the pedal 17 to a position in which the cross-section of the passage is increased, while the rotary speed of the engine is to remain unchanged although the load is simultaneously increased.

In this case, the opening of the valve 14 has the effect that the amount of air permitted to pass through the duct 13 is somewhat increased whereby the temperature of the heatable resistor 22 is further lowered. Consequently, the resistance of this resistor 22 increases and the bridge circuit assumes an unbalanced condition because the branch current $J_o$ flowing through the resistors 21, 22 and 23 decreases. The voltage drop across the resistor 21 decreases also so that the potential at the emitter electrode E of the transistor 25 becomes more positive than the potential at the base electrode B which remains unchanged. Therefore, a corresponding small control current flows from the emitter to the base electrode whereby a comparatively much more rapidly increasing collector current $J_c$ (due to the amplifying effect of the transistor) flows through the primary winding 26a of the transformer and through the solenoid coil 27.

The secondary winding 26b is so connected and polarized that the voltage induced therein causes the potential at the base of the transistor to decrease on account of the increasing collector current $J_c$, so that the potential difference between emitter and base is increased. It can be seen that the winding 26b produces a feedback effect. The result of this is that the collector current $J_c$ increases practically to a maximum which is limited by the construction data of the transistor, and this occurs as soon as the resistance of the heatable resistor 22 increases only by a small amount. As soon as the collector current $J_c$ has practically reached its maximum, the feedback voltage induced in the feedback winding 26b disappears so that simultaneously the control current between the emitter and base electrodes and therefore also the collector current $J_c$ starts to decrease.

On account of this feedback operation a series of current impulses $J_c$ closely following each other is generated which continues as long as the bridge circuit is not brought back to balanced condition.

This return of the bridge circuit to balanced condition is obtained due to the fact that every time an impulse of current passes through the solenoid 27, the armature 28 is attracted from the position shown in the drawing whereby the valve 29 is lifted from its seat against the action of spring 29', for a very short period of time. Every time the valve 29 is lifted some air is permitted to pass into the vacuum chamber 30. Hereby, the vacuum therein is reduced with the consequence that the diaphragm of the diaphragm device 31 is subjected to less vacuum pull and therefore tends to return from its "pulled-in" position towards its normal position which causes the transmission means 32 to move the lever 12 into a position causing more fuel to be injected into the cylinders. At the same time the tapping contact 24' of the potentiometer is moved by the transmission means 34 towards the opposite end thereof indicated by a. Only after by the adjustment of the tapping contact 24' the balanced condition of the bridge circuit has been restored and the increase of resistance of the heatable resistor 22 due to the increased velocity of the air stream in the duct 13 has been compensated, the current impulses causing lifting of the valve 29 will discontinue because only then no potential difference between emitter and base appears across the transistor 25 whereby the latter is changed to practically non-conductive condition. The reduced pressure remaining in the vacuum chamber 30 after the bridge circuit has been returned into balanced condition, consequently is in a fixed relation to the amount of fuel that is required for operating the engine on account of the position of the butterfly valve 14 in which the passage cross-section area for the air has been increased; the amount of fuel injected under the conditions has been adjusted simultaneously with the return of the bridge to balanced condition because the control lever 12 has been turned accordingly by the action of the diaphragm device 31.

*2nd condition.*—The rotary speed of the engine may increase due to decreasing load, the position of the butterfly valve, however, is to remain unchanged.

In this case, an increase of rotary speed would at the same time cause an increase of velocity of air in the duct 13 which would result in greater reduction of the temperature of the heatable resistor 22 so that all the consequences described above in the case of the first condition would result and the amount of fuel injection would be increased. However, in the case of the second condition mentioned above this must not occur. To the contrary, the amount of fuel injected shall be reduced on account of the reduced load. This goal is reached by means of the second variable resistor 23 which is controlled by the governor 35. On account of the increased rotary speed the movable tapping contact 23' is moved towards the end $g$ of the resistor 23 so as to reduce the resistance thereof whereby the increase of resistance in the heatable resistor 22 is compensated by the reduction of the resistance of the variable resistor 23. It is even possible to arrange matters in such a manner that with increasing rotary speed the resistance of the variable resistor 23 is reduced comparatively more than the resistance of the heatable resistor 22 increases.

In the case of operation of the engine at half load the butterfly valve 14 is in a position which causes the amount of air drawn in through the duct 13 to be comparatively small. In spite of the fact that the valve 14 is held in unchanged position, the amount of air drawn in will initially increase in proportion with the rotary speed. As the rotary speed increases to comparatively high values a sort of "saturation" condition develops inasmuch as the amount of air drawn in increases only very little with the increase of the rotary speed. It is now necessary that the amount of fuel injected into the engine per cycle closely follows the behavior of the drawn-in amounts of air so as to maintain the desired stoichiometric proportion between fuel consumption and air supply. This result is obtained by the combination of the heatable resistor 22 with the variable resistor 23. While the resistance of the variable resistor 23 is reduced in proportion to the increased rotational speed by means of the action of the governor 35, the reduction of temperature of the heatable resistor 22 increases only little in the upper ranges of the rotary speeds because in these ranges the amounts of air drawn in varies only little. In contrast with operations in the lower speed range, in the upper speed range the reduction of the resistance of the variable resistor 23 is therefore not fully compensated by the increase of resistance in the heatable resistor 22 so that with increasing rotary speed the total resistance appearing between the emitter electrode E and the transistor 25 and the minus pole of the source is gradually reduced.

The potential of the emitter electrode is therefore shifted in direction towards negative values. On account of this the transistor 25 remains in blocked condition and the valve 29 is not lifted because there are no current impulses $J_c$ to do this. The vacuum in the vacuum chamber 30, however, can increase on account of the increase in velocity of the air stream caused by the increase of rotary speed. Thus, the tapping contact 24' of the potentiometer 24 is moved downwardly toward the end $e$ of the potentiometer 24 and simultaneously also the control lever 12 of the injection pump 10 is moved downwardly. By this adjustment of the potentiometer the base electrode B is made negative relative to the emitter electrode E of the transistor 25 so that a base current $J_b$ is caused to start whereby the above-described series of impulses is started by which the vacuum in the chamber 30 is decreased by the air permitted to move in via the pulsatingly opened valve 29 until the amount of fuel injected by the pump 10 is adjusted to the desired value while at the same time the tapping contact 24' is returned in direction to the end $a$ thereof until the balanced condition of the bridge circuit is restored and consequently, the generation of current impulses $J_c$ is discontinued.

If the butterfly valve 14 is moved from a "fully open" position in which the valve plate extends practically parallel with the axis of the duct 13, is suddenly changed to a position corresponding to idling, or vice versa, the following takes place:

The very small flow resistance existing in the "fully open" position of the valve 14 results in a very weak vacuum in the duct 13 and consequently in the vacuum chamber 30. Therefore, the amount of fuel injected during every operational cycle is very large. If now the valve 14 is returned from this position into its idling position which results in a very considerable flow resistance in the duct 13, then the vacuum in the vacuum chamber 30 increases very substantially so that the diaphragm of the diaphragm device 31 is pulled inwardly whereby the tapping contact 24' is moved in direction of the end $e$ of the potentiometer 24. However, due to this adjustment of the potentiometer the transistor 25 becomes again conductive and the current impulses started thereby are again in a position of causing opening of the valve 29.

In order to obtain a satisfactory operation the cross-sectional area at the butterfly valve 14 must be larger than the cross-sectional area of the valve 29. In that case, the development of vacuum in the vacuum chamber 30 leads the decrease of resistance in the heatable resistor 22 when the velocity of the air stream in the duct 13 decreases. On account of this the fuel control is a little ahead of the changes in velocity of the air in the duct 13. If, however, during idling of the engine, i.e. considerable vacuum in the vacuum chamber 30 and during adjustment of the fuel injection pump 10 to small deliveries, the butterfly valve 14 is suddenly moved into "fully open" position by operation of the pedal, then the vacuum in the duct 13 collapses and the vacuum in the vacuum chamber 30 likewise decreases because of the very small throttling effect of the valve. In this case, the tapping contact 24' of the potentiometer 24 is moved in direction to more positive values and at the same time the control lever 12 of the pump 10 is adjusted for larger fuel delivery. The transistor 25 remains first in blocked condition because the potential at its base has assumed more positive values on account of the adjustment of the potentiometer 24. However, the injection of larger amounts of fuel result in an increase of the rotary speed of the engine. On account of this the amount of air passing through the duct 13 increases, the heatable resistor 22 is rapidly cooled down and therefore its resistance increases. If the thermal capacity of the heatable resistor 22 is small enough then the thermal inertia thereof is small and the resistance of the resistor 22 increases more rapidly than the pressure decreases in the chamber 30. The potential of the emitter electrode E is then shifted to more positive values due to the increase of resistance in the resistor 22, which occurs more rapidly than the change of potential at the base electrode B so that again the transistor is in a position of furnishing current impulses until the pressure or the vacuum in the chamber 30 has been adjusted to the proper value.

It will be understood that each of the elements described above, or two or more together, may also find a useful application in other types of fuel injection control devices differing from the types described above.

While the invention has been illustrated and described as embodied in an electrical fuel control device for internal-combustion engines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Electrical fuel injection control device for internal-combustion engines, comprising, in combination, an air supply duct for permitting air to be drawn into the engine; mechanical control means for controlling the amount of fuel injected into said engine; pressure-sensitive control means connected with said air duct and with said mechanical control means, and including a vacuum chamber communicating with said air duct and provided with a diaphragm device mechanically coupled with said mechanical control means, so that said pressure-sensitive control means is capable of actuating the latter depending upon the pressure existing in said vacuum chamber, said chamber having an ordinarily closed air inlet valve which, when opened, causes decrease of any vacuum existing in said chamber; and electrical control means operatively connected with said air inlet valve and with said air duct, and capable of modifying the vacuum in said vacuum chamber by opening said inlet valve depending upon the velocity of the air stream in said air duct.

2. Electrical fuel injection control device for internal-combustion engines, comprising, in combination, an air supply duct for permitting air to be drawn into the engine; mechanical control means for controlling the amount of fuel injected into said engine; pressure-sensitive control means connected with said air duct and with said mechanical control means, and including a vacuum chamber communicating with said air duct and provided with a diaphragm device mechanically coupled with said mechanical control means, so that said pressure-sensitive control means is capable of actuating the latter depending upon the pressure existing in said vacuum chamber, said chamber having an ordinarily closed air inlet valve which, when opened, causes decrease of any vacuum existing in said chamber; and electrical control means operatively connected with said air inlet valve and including velocity-sensitive means mounted within said air duct, and capable of modifying the vacuum in said vacuum chamber by opening said inlet valve depending upon the velocity of the air stream in said air duct.

3. A control device as set forth in claim 2, wherein said electrical control means includes electronic amplifier means capable of generating self-excited relaxation-oscillations and a potentiometer connected in circuit therewith and having a movable tapping contact capable of being adjusted depending upon the output of oscillations by said amplifier means.

4. A control device as set forth in claim 3, including a bridge circuit one branch of which is constituted by said potentiometer, the other branch of which is a variable resistor constituting said velocity-sensitive means, while the diagonal potential appearing at any time in said bridge circuit is applied to the control electrode of said amplifier.

5. A control device as set forth in claim 4, wherein said variable resistor is a heatable resistor having a negative thermal characteristic so that with decreasing temperature thereof due to increasing air velocity in said duct its resistance increases.

6. A control device as set forth in claim 5, including a second variable resistor connected in series with said heatable resistor, and speed-sensitive control means operatively connected with said second variable resistor and with said engine, and capable of adjusting the resistance of said second variable resistor depending upon the rotary speed of said engine.

7. A control device as set forth in claim 6, including electromagnet means connected in circuit with said amplifier means and operatively connected with said air inlet valve so that said valve is opened whenever said electromagnet means is energized by said amplifier.

8. A control device as set forth in claim 7, wherein said amplifier means is a transistor.

9. A control device as set forth in claim 8, including a transformer having a primary and a secondary winding, said primary winding connected in series between said electromagnet means and the collector electrode of said transistor, while said secondary winding is so wound and connected in the emitter-base circuit of said transistor that during increase of the collector current flowing through said electromagnet means the control current of said transistor is increased for greater amplification.

10. A control device as set forth in claim 9, wherein said secondary winding is connected between the base electrode of said transistor, and said tapping contact of said potentiometer.

11. A control device as set forth in claim 10, wherein said electrical control means include a mechanical control connection between said diaphragm device and said movable tapping contact of said potentiometer so that the power required for moving said tapping contact is delivered by said diaphragm device together with the actuation of said mechanical control means controlling the fuel injection.

References Cited in the file of this patent

UNITED STATES PATENTS

| | | |
|---|---|---|
| 2,516,828 | Reggio | July 25, 1950 |
| 2,673,556 | Reggio | Mar. 30, 1954 |